(No Model.)  2 Sheets—Sheet 1.
C. R. ARNOLD.
SYSTEM OF CAR LIGHTING OR HEATING.
No. 520,403.  Patented May 29, 1894.
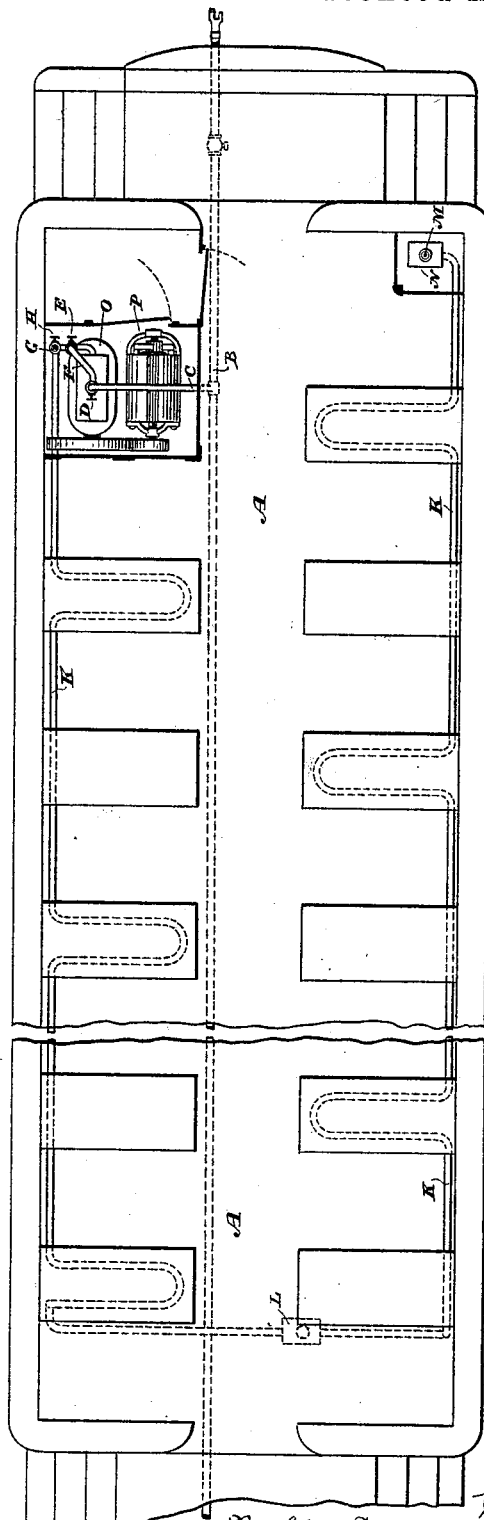
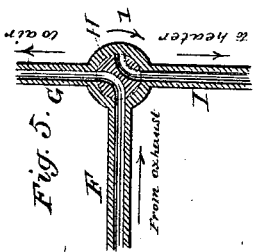
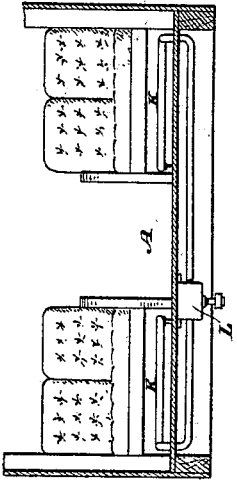
Witnesses
Geo. W. Breck.
Wm. H. Capel.
Inventor
Craig R. Arnold.
By his Attorney
H. E. Townsend.

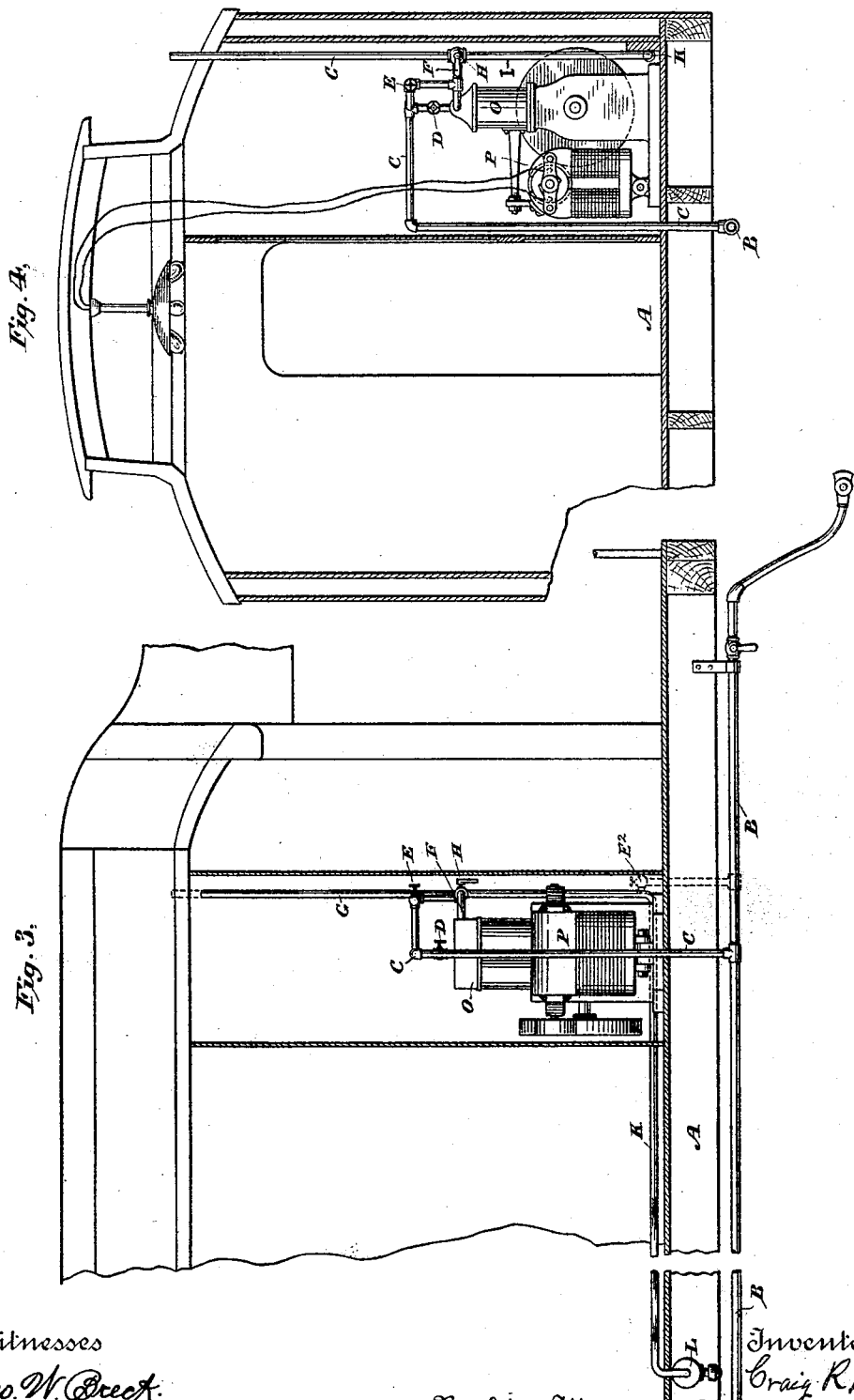

UNITED STATES PATENT OFFICE.

CRAIG R. ARNOLD, OF SHARON HILL, PENNSYLVANIA.

SYSTEM OF CAR LIGHTING OR HEATING.

SPECIFICATION forming part of Letters Patent No. 520,403, dated May 29, 1894.

Application filed July 13, 1889. Serial No. 317,423. (No model.)

*To all whom it may concern:*

Be it known that I, CRAIG R. ARNOLD, a citizen of the United States, and a resident of Sharon Hill, in the county of Delaware and State of Pennsylvania, have invented a certain new and useful System of Car Lighting or Heating, of which the following is a specification.

My invention consists of a lighting and heating system for railway cars, comprising in combination a dynamo and its operating engine, a pipe leading from a boiler for supplying steam to said engine and to the heating coils, valves therein to direct the passage of live steam from said pipe to the engine or to the coils at will and a pipe connected with the exhaust of the engine and with the pipe leading to the heating coils and having therein a valve or cock whereby exhaust steam may be directed to said coils at will.

My invention consists further in the combination with a dynamo and its operating engine, and heating coils, of pipes for carrying live steam to the engine and to the heating coils, cocks or valves to direct the live steam to the coils or engine at will, an exhaust pipe from the engine, an escape pipe, a pipe leading to the heating coils and communicating with the exhaust pipe from the engine, and valves or cocks to control the communication between said exhaust pipe, the escape pipe and the pipe leading to the heating coils, whereby both live and exhaust steam, or either may be directed to the heating coils, or cut off either from the engine or the coils.

My invention consists further in a combined system of lighting and heating comprising a main steam supply pipe constituting a distributing pipe extending through the train independently of the steam heaters and carrying steam under high pressure, branches therefrom at intervals each connecting to a steam engine on a car, a dynamo run by said engine and supplying electric lamps on the car, a system of heating pipes connected at one end with the exhaust of the engine and at the other with a suitable outlet independently of the main pipe and a suitable cock or valve in connection with each dynamo engine and heater whereby live steam may be taken from said main pipe directly to the heater or to the engine at will.

My invention consists also in certain devices and combinations of devices whereby the apparatus is adapted to various conditions of use as will be hereinafter more fully specified in the claims.

In the application of my invention to heating and lighting railway cars, I propose to supply live steam under high pressure to a distributing pipe running through the train and deriving its steam supply from the locomotive boiler.

Suitable couplings are provided for connecting the pipes of adjoining cars.

On each car I place a dynamo machine of any pattern connected to the wiring of the car and drive such dynamo by an engine which takes steam from a branch pipe leading from the main distributer pipe, and exhausts its steam into a system of steam heating pipes on the car or into other heating appliances, as, for instance, a heating coil in an air box through which air is introduced into the car. In this system there is in effect a main distributing pipe supplying the steam dynamos as well as the heaters in multiple arc. The steam distributed through the train by the main pipe and led to the various engines might be generated in a separate boiler carried by a car equipped for the purpose, but the simpler way is to take the steam direct from the locomotive and this is the preferred arrangement to which I lay special claim.

While in ordinary cases I prefer to place a dynamo on each car of the train, this is not essential, as the dynamo of one car might have its main wires connecting to the electric wiring of an adjoining car for lighting the latter, and other means be used in place of the exhaust steam for heating the latter car.

In combination with the engine and dynamo, run and employed as above stated, I propose to use a by-pass for the live steam taken from the train pipe and shunted around the engine at pleasure into the steam heating appliances, thus permitting the car to be heated without running the dynamo. The admission of the live steam or steam under pressure into the heating pipes directly also serves the purpose at starting of making a forced circulation and driving out any water of condensation.

I am aware that it has been before proposed to heat cars by steam taken through a train pipe, the heating pipes or systems of each car being included in a train pipe so that the heaters in each car would exhaust through the heaters of cars behind it. I am also aware that it has been proposed to use the exhaust from the locomotive for thus heating, the circulation being assisted by a suitable pump at the end of the system, and do not wish to be understood as claiming either of such features.

Having described the general nature of my invention, I will proceed to describe the same referring to the accompanying drawings in which I have illustrated the application of the same to a railway car.

Figure 1, is a car floor plan showing the apparatus in position. Fig. 2, is an end elevation showing a part of the steam heating pipes. Fig. 3, is a side elevation of the apparatus. Fig. 4, is a vertical cross section through a car and shows the engine and dynamo with connecting pipes in elevation, and Fig. 5 an enlarged detail view showing the three-way cock.

A, is the floor of the car, and B, a live steam pipe running beneath the flooring although it might be placed in other positions. This pipe is supplied with suitable couplings at each end after the manner of an air brake pipe whereby it may be connected with the pipe of an adjoining car or may be closed at one end when the car is the last car of the train. Live steam under as high pressure as practicable is supplied to pipe B, from the locomotive or from other source. When a number of cars are coupled the pressure is maintained in pipes B, through the whole length of the train.

P, is a dynamo electric machine of any suitable construction coupled to a steam engine O, after the manner described in my prior Patent No. 366,292, or in any other desired way. The engine and dynamo are placed in a compartment on the car, and the dynamo is connected to the circuit leading to the electric lights disposed as desired in the car for lighting the same. Steam is supplied to the engine from pipe B, through a riser or branch pipe C. A cock or throttle valve D, controls the starting and stopping of the engine.

F, is a pipe or connection leading from the exhaust of the engine, and adapted to convey the exhaust steam to heating appliances of any desired description in the car. The exhaust steam may pass through a system of heating pipes K, disposed as usual and terminating in an escape pipe at M, leading through the top or bottom of the car. The exhaust might be conveyed for instance to the circulating pipes of a Baker heater in cars already equipped for hot water or steam heating.

L, is a trap and automatic valve, of any desired description for permitting water of condensation to collect and escape to the ground. N, is a similar trap for bleeding the water from the coils of a heater.

A direct escape pipe indicated at G, is connected to exhaust-pipe F, through a stop cock H, of any suitable description which is closed when the car is to be heated by the exhaust steam. The cock H, might be a three way cock placed in the connection from F, to the heating appliances and adapted to cut off the connection from F to I, and the heater or open connection to G, and vice versa, to close G, and open connection to I, as described.

E, is a stop-cock in a by-pass through which steam may be admitted from B, directly to the pipe I, and so to the heating appliances without passing to the engine. The by-pass might obviously be a separate branch controlled by a cock as indicated at $E^2$. By means of the by-pass the live steam may be admitted directly to the heating pipes when it is desired to stop the engine and heat the car or when, at starting, it is desired to produce a forced circulation.

My system for heating and lighting operates as follows: When it is desired to both light and heat, the three-way cock, H, is turned into the position indicated in Fig. 5, and the throttle-valve, D, is opened, the stop-cock, E, being either closed or opened, according as it is desired to heat by exhaust steam from the dynamo-engine, O, alone or by both exhaust and live steam. When it is desired to light the cars without heating them as will be the case in warm weather, the three-way cock, H, is turned so as to cut off the connection from F and the engine, O, to pipe, I, and to open the connection with the escape-pipe, G, the stop cock, E, being also closed, while the throttle-valve, D, remains open. The exhaust steam will then pass to the air through escape-pipe, G. When it is desired to heat the coils without running the dynamo for lighting, as generally during the day, the throttle-valve, D, is closed, the three-way cock, H, is turned in the direction indicated in Fig. 5 and the stop-cock, E, is opened. This adjustment of the cocks or valves, with or without closing the throttle-valve, D, may also be resorted to when at starting, it is necessary to force the circulation and drive out the water of condensation.

What I claim as my invention is—

1. In a heating and lighting system for railway cars the combination with a dynamo and its operating engine of pipes for supplying steam to said engine and to the heating-coils, valves or cocks therein to direct the passage of live steam to the engine or to the coils, at will, and a pipe connected with the exhaust of the engine and with the pipe leading to the heating-coils and having therein a valve or cock, whereby exhaust steam may be directed to said coils at will, substantially as described.

2. In a heating and lighting system for railway-cars, the combination with a dynamo and its operating engine, and heating coils, of pipes for carrying live steam to the engine and to the heating coils, cocks or valves to direct the live steam to the coils or engine, at will, an exhaust-pipe from the engine, an escape-pipe, a pipe leading to the heating-coils and communicating with the exhaust-pipe from the engine, and valves or cocks to control the communication between said exhaust-pipe, the escape-pipe and the pipe leading to the heating coils, whereby either live or exhaust steam, or both may be directed to the heating coils, or cut off either from the engine or the coils, substantially as described.

3. In a heating and lighting system for railway cars, the combination with a dynamo and its operating engine, of a main pipe supplied with live steam from the locomotive, a branch or riser therefrom leading to the engine and containing a cock or valve, a pipe connected with the exhaust of the engine for leading the exhaust steam thereof to a heater, a valve for directing the exhaust at pleasure to an escape, and a by-pass connecting said main or live steam pipe with said heater and containing a cock or valve, as and for the purpose described.

4. In a heating and lighting system for railway cars, the combination with a dynamo and its operating engine, of a main steam supply pipe having a branch to the engine and a valve in said branch, an exhaust pipe leading from the engine to the atmosphere and having a valve therein, and a second exhaust pipe connected with the first and to the heater pipe, and having a valve therein and a valve in a connection between the main steam pipe and second exhaust pipe connection, substantially as described.

Signed at Chester, in the county of Delaware and State of Pennsylvania, this 15th day of June, A. D. 1889.

CRAIG R. ARNOLD.

Witnesses:
FRANZ RABL,
P. M. WASHABAUGH.